(12) United States Patent
Mai

(10) Patent No.: US 11,839,320 B2
(45) Date of Patent: *Dec. 12, 2023

(54) EMULATIONAL CHRISTMAS TREE BRANCH AND MANUFACTURING PROCESS THEREFOR

(71) Applicant: Shenzhen City Ming Jie Hao Technology Co., Ltd., Shenzhen (CN)

(72) Inventor: Junjie Mai, Shenzhen (CN)

(73) Assignee: SHENZHEN CITY MING JIE HAO TECHNOLOGY CO., LTD., Shenzhen (CN)

(*) Notice: Subject to any disclaimer, the term of this patent is extended or adjusted under 35 U.S.C. 154(b) by 121 days.

This patent is subject to a terminal disclaimer.

(21) Appl. No.: 17/402,311

(22) Filed: Aug. 13, 2021

(65) Prior Publication Data

US 2021/0369033 A1    Dec. 2, 2021

Related U.S. Application Data

(63) Continuation of application No. 16/349,906, filed as application No. PCT/CN2017/072529 on Jan. 24, 2017, now Pat. No. 11,116,346.

(30) Foreign Application Priority Data

Nov. 14, 2016 (CN) .......................... 201610997680.8

(51) Int. Cl.
*A47G 33/06* (2006.01)
*B29C 45/14* (2006.01)
*B29L 31/00* (2006.01)

(52) U.S. Cl.
CPC ........ *A47G 33/06* (2013.01); *B29C 45/14336* (2013.01); *B29C 45/14* (2013.01); *B29L 2031/7026* (2013.01)

(58) Field of Classification Search
CPC ........ A47G 33/12; A47G 33/08; A47G 33/06; A47G 33/04; B29C 45/14336
See application file for complete search history.

(56) References Cited

U.S. PATENT DOCUMENTS

| | | | |
|---|---|---|---|
| 1,478,728 A | 12/1923 | Brown |
| 2,826,845 A | 3/1955 | Warren |

(Continued)

FOREIGN PATENT DOCUMENTS

| | | | |
|---|---|---|---|
| CN | 2075045 U | 4/1991 |
| CN | 101088437 A | 12/2007 |

(Continued)

OTHER PUBLICATIONS

International Search Report and Written Opinion of the International Searching Authority dated Jul. 18, 2017, for corresponding PCT/CN2017/072529, 7 pages.

(Continued)

*Primary Examiner* — Stella K Yi
(74) *Attorney, Agent, or Firm* — Cozen O'Connor

(57) ABSTRACT

An artificial tree branch includes a tree branch body formed by injection molding a first material over an internal structural member of a second material. The tree branch body includes a main body portion having an elongated shape with a first end and a second end, and a plurality of sockets formed at various positions along the main body. Each socket is formed as an outward bulge from the main body portion, with the outward bulge defining a cavity to receive and retain artificial tree leaves.

20 Claims, 1 Drawing Sheet

(56) References Cited

U.S. PATENT DOCUMENTS

| | | |
|---|---|---|
| 2,976,632 A | 10/1959 | Nicholas |
| 3,594,260 A | 7/1971 | Dieffenbach |
| 4,968,541 A | 11/1990 | McCrory |
| 5,077,646 A | 12/1991 | Parsons |
| 5,409,745 A | 4/1995 | McGuire |
| 5,455,750 A | 10/1995 | Davis et al. |
| 5,855,705 A | 1/1999 | Gauthier |
| 6,037,021 A | 3/2000 | Koo |
| 6,117,503 A | 9/2000 | Lee et al. |
| 6,180,194 B1 | 1/2001 | Liang |
| 6,257,793 B1 | 7/2001 | Lin |
| 6,320,327 B1 | 11/2001 | Lavatelli et al. |
| 6,431,740 B1 | 8/2002 | Puleo |
| 6,907,168 B2 | 6/2005 | Tang |
| 7,232,596 B2 | 6/2007 | Lai |
| 8,298,633 B1 | 10/2012 | Chen |
| 8,932,689 B2 | 1/2015 | Wei |
| 9,439,528 B2 | 9/2016 | Chen |
| 9,484,687 B1 | 11/2016 | Chen |
| 2004/0001923 A1 | 1/2004 | Kao |
| 2004/0096596 A1 | 5/2004 | Palmer, III et al. |
| 2004/0191431 A1 | 9/2004 | Lai |
| 2005/0197039 A1 | 9/2005 | Bentley |
| 2007/0230174 A1 | 10/2007 | Hicks et al. |
| 2010/0003891 A1 | 1/2010 | Chen |
| 2010/0323129 A1 | 12/2010 | Tsai |
| 2011/0033641 A1 | 2/2011 | Tsai |
| 2018/0132645 A1 | 5/2018 | Mak |
| 2018/0206663 A1 | 7/2018 | George |

FOREIGN PATENT DOCUMENTS

| | | | |
|---|---|---|---|
| CN | 201759314 U | | 3/2011 |
| CN | 205585807 U | | 9/2016 |
| WO | WO2010057426 | * | 5/2010 |

OTHER PUBLICATIONS

Advantages of Adhesives Over Mechanical Assembly, MasterBond, Jan. 8, 2015, https://www.masterbond.com/techtips/advantages-adhesives-over-mechanical-assembly.
File History of U.S. Appl. No. 15/660,464.
File History of U.S. Appl. No. 16/349,906.
Office Action of Chinese Application No. 201610997680.8.

* cited by examiner

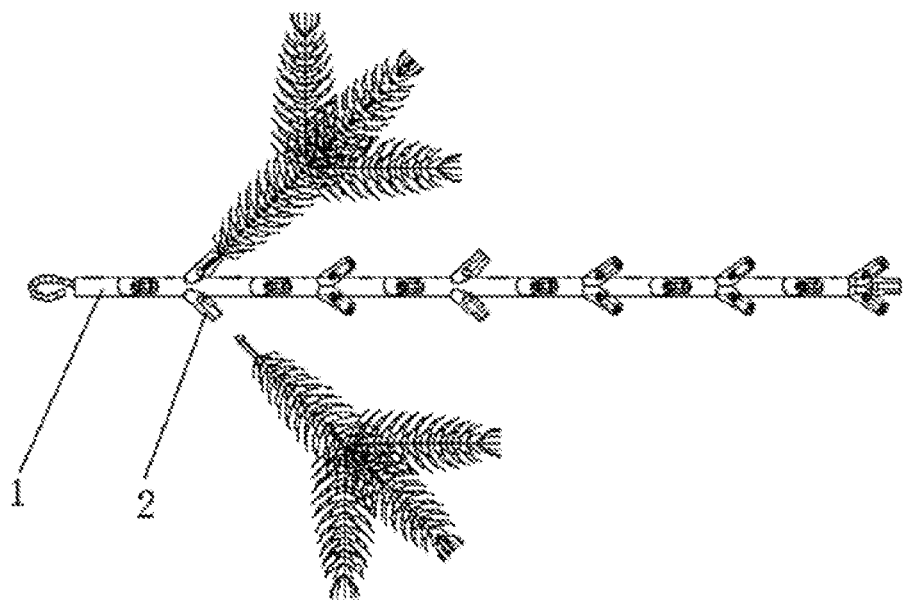

_EMULATIONAL CHRISTMAS TREE BRANCH AND MANUFACTURING PROCESS THEREFOR_

RELATED APPLICATIONS

This is a continuation of U.S. patent application Ser. No. 16/349,906 filed on May 14, 2019 which is U.S. National Phase Application under 35 USC 371 of International Application PCT/CN2017/072529 filed on Jan. 24, 2017 which claims the priority of Chinese Application No. 201610997680.8 filed Nov. 14, 2016, the entire content of each of which is incorporated by reference into the Detailed Description herein.

TECHNICAL FIELD

The present invention relates to the technical field of artificial Christmas tree branch processing, in particular to an artificial Christmas tree branch and a process for manufacturing same.

BACKGROUND

As people's living standards improve, people pursue a higher quality of life. Certain artificial Christmas trees are also serving a decorative function to an ever increasing extent. However, some decorative Christmas trees are often not very lifelike, and are produced by binding in manually operated machinery. Christmas trees made in this way have an excessively high cost and deform easily, and layers easily fall off. During production, a large amount of manual labour is required to spread out each leaf in each layer. Moreover, after buying the Christmas tree and taking it home, the customer also has to spread out each leaf in each layer. The gaps are not uniform, and every Christmas tree produced is different. These are all problems in need of a solution.

SUMMARY

Aspects of the embodiments disclosed herein to an artificial Christmas tree branch and a process for manufacturing same.

Some embodiments employ the following technical solution:

An artificial Christmas tree branch, comprising an artificial Christmas tree branch body, characterized in that a socket is provided on the artificial Christmas tree branch body, and a hook for assembling a Christmas tree is provided at one end of the artificial Christmas tree branch body; tree bark texture is uniformly distributed, or tree bark texture is half-distributed, or no tree bark texture is provided, on the artificial Christmas tree branch body.

Aspects of some embodiments disclosed herein also include a process for manufacturing an artificial Christmas tree branch, comprising the following steps:

S1: manufacturing a mould for injection moulding:
1). using 3D software to draw a mould drawing, making an artificial model from a conceptualized mould style using 3D software, at the same time performing graphic modification according to an actual branch style to be attained, until a required result is reached;
2). numerical control processing centre processing; based on a mould model drawn by 3D software, automatic programming design can be performed using 3D software; programming data is imported into the numerical control processing centre, and numerical control processing of the mould can be performed; during processing, attention must be paid to the brightness and cleanliness of a mould surface, so that subsequent injection moulding is more convenient and quick, and demoulding is more simple and convenient;
3). trimming of mould interior; there is a great deal of tree bark texture on the artificial Christmas tree branch; when injection moulding is performed in the mould, carving design of this tree bark texture must be performed artificially by hand; at the same time, attention must be paid during carving to the trimming of iron dust and rough edges, to remove the iron dust and rough edges, and prevent product quality from being affected;

S2: addition of steel wire: a steel wire is arranged in the mould before injection moulding; the steel wire is arranged uniformly, such that the steel wire has a supporting and reinforcing action in the injection-moulded branch;

S3: injection moulding: a starting material is softened with the cooperation of an injection moulding machine; the starting material may be injected into the mould by means of the injection moulding machine, in order to injection-mould the artificial Christmas tree branch;

S4: manufacture of socket on branch body: the manufacture of the socket generally requires a push pin to be added and put into a socket position during injection moulding, so that when injection moulding is performed, the push pin will cause the socket to be reserved at the socket position, and the manufacture of the artificial Christmas tree branch body is thereby completed;

S5: cooling and demoulding: cooling is performed to reduce the temperature, and the moulded artificial Christmas tree branch is taken out, in order to be used subsequently; water-cooling is used for auxiliary temperature reduction during cooling and demoulding.

Compared with the prior art, the artificial Christmas tree branch has the following beneficial effects: The present invention lowers costs, simplifies technology, saves energy, facilitates assembly, refines technology, has high precision, is more three-dimensional, feels more real, is safer, increases production efficiency, is more user-friendly, is easy to disassemble, can be used in cooperation with all kinds of tree leaves, and is diversified. The degree of lifelikeness is high, the assembly process does not require any machinery, distance and shape can be controlled accurately, ensuring the same distance for each set of branches and very accurate shape, binding technology is developed into socket technology, safety is improved, and production efficiency is increased; the artificial Christmas tree branch can be matched up freely with different tree leaves, is more diversified, is more user-friendly, is specifically used to manufacture various types of decorative articles such as Christmas trees, Christmas rattan and Christmas wreaths; a tree made from the artificial Christmas tree branch does not need to be spread out, so the hassle of a customer having to spread out the tree himself after buying it and taking it home is avoided—after being bought and taken home by the customer, it will have the shape of a Christmas tree; at the same time, the addition of the steel wire in the branch body can greatly increase the strength of the branch body.

BRIEF DESCRIPTION OF THE DRAWING

FIG. 1 is a three-dimensional structural schematic diagram of the present invention.

In the FIGURE: 1—artificial Christmas tree branch body, 2—socket.

DETAILED DESCRIPTION OF PREFERRED EMBODIMENTS

In order to clarify the object, technical solution and advantages of the present invention, the present invention is explained in further detail below with reference to a particular embodiment. It should be understood that the particular embodiment described here is merely intended to explain the present invention, not to limit it.

Embodiment 1

An artificial Christmas tree branch, comprising an artificial Christmas tree branch body 1, characterized in that sockets 2 are provided on the artificial Christmas tree branch body 1, and a hook for assembling a Christmas tree is provided at one end of the artificial Christmas tree branch body 1; tree bark texture is uniformly distributed, or tree bark texture is half-distributed, or no tree bark texture is provided, on the artificial Christmas tree branch body 1.

The present invention also provides a process for manufacturing an artificial Christmas tree branch, comprising the following steps:

S1: manufacturing a mould for injection moulding:
1). using 3D software to draw a mould drawing, making an artificial model from a conceptualized mould style using 3D software, at the same time performing graphic modification according to an actual branch style to be attained, until a required result is reached;
2). numerical control processing centre processing; based on a mould model drawn by 3D software, automatic programming design can be performed using 3D software; programming data is imported into the numerical control processing centre, and numerical control processing of the mould can be performed; during processing, attention must be paid to the brightness and cleanliness of a mould surface, so that subsequent injection moulding is more convenient and quick, and demoulding is more simple and convenient;
3). trimming of mould interior; there is a great deal of tree bark texture on the artificial Christmas tree branch; when injection moulding is performed in the mould, carving design of this tree bark texture must be performed artificially by hand; at the same time, attention must be paid during carving to the trimming of iron dust and rough edges, to remove the iron dust and rough edges, and prevent product quality from being affected;

S2: addition of steel wire: a steel wire is arranged in the mould before injection moulding; the steel wire is arranged uniformly, such that the steel wire has a supporting and reinforcing action in the injection-moulded branch;

S3: injection moulding: a starting material is softened with the cooperation of an injection moulding machine; the starting material may be injected into the mould by means of the injection moulding machine, in order to injection-mould the artificial Christmas tree branch;

S4: manufacture of sockets on branch body: the manufacture of the sockets generally requires push pins to be added and put into socket positions during injection moulding, so that when injection moulding is performed, the push pins will cause the sockets to be reserved at the socket positions, and the manufacture of the artificial Christmas tree branch body is thereby completed;

S5: cooling and demoulding: cooling is performed to reduce the temperature, and the moulded artificial Christmas tree branch is taken out, in order to be used subsequently; water-cooling is used for auxiliary temperature reduction during cooling and demoulding.

The present invention lowers costs, simplifies technology, saves energy, facilitates assembly, refines technology, has high precision, is more three-dimensional, feels more real, is safer, increases production efficiency, is more user-friendly, is easy to disassemble, can be used in cooperation with all kinds of tree leaves, and is diversified. The degree of lifelikeness is high, the assembly process does not require any machinery, distance and shape can be controlled accurately, ensuring the same distance for each set of branches and very accurate shape, binding technology is developed into socket technology, safety is improved, and production efficiency is increased; the artificial Christmas tree branch can be matched up freely with different tree leaves, is more diversified, is more user-friendly, is specifically used to manufacture various types of handicrafts such as artificial Christmas trees, artificial Christmas rattan and artificial Christmas wreaths; a tree made from the artificial Christmas tree branch does not need to be spread out, so the hassle of a customer having to spread out the tree himself after buying it and taking it home is avoided—after being bought and taken home by the customer, it will have the shape of a Christmas tree; at the same time, the addition of the steel wire in the branch body can greatly increase the strength of the branch body.

The above embodiment is merely a preferred particular embodiment of the present invention, but the scope of protection of the present invention is not limited to this. All equivalent substitutions or changes made by any person skilled in the art within the technical scope disclosed in the present invention on the basis of the technical solution of the present invention and the inventive concept thereof should be included in the scope of protection of the present invention.

The invention claimed is:

1. An artificial tree branch, comprising:
a tree branch body formed by injection molding a first material over an internal structural member of a second material, the internal structural member providing strengthening structural support for the tree branch, wherein the tree branch body includes:
a main body portion having an elongated shape with a first end and a second end;
a fastener proximate the first end, the fastener adapted to attach the artificial tree branch to a tree; and
a plurality of sockets formed at various positions along the main body, each socket being formed as an outward bulge from the main body portion, the outward bulge defining a cavity to receive and retain artificial tree leaves.

2. The artificial tree branch of claim 1, wherein the internal structural member includes a protruding portion that protrudes from the first end of the tree branch body to form the fastener.

3. The artificial tree branch of claim 2, wherein the protruding portion includes a hook.

4. The artificial tree branch of claim 1, wherein the fastener is a hook.

5. The artificial tree branch of claim 1, wherein the internal structural member comprises a wire.

6. The artificial tree branch of claim 1, wherein the second material is steel.

7. The artificial tree branch of claim 1, wherein the tree branch body is formed by injection molding of the first material around the internal structural member.

8. The artificial tree branch of claim 1, wherein at least a portion of the tree branch body has a tree-bark texture formed therein.

9. The artificial tree branch of claim 1, wherein the cavity of each socket is formed around a removable pin that reserves the cavity during the injection molding.

10. The artificial tree branch of claim 1, wherein the elongated shape of the main body portion is generally straight.

11. The artificial tree branch of claim 1, further comprising a plurality of the artificial tree leaves.

12. The artificial tree branch of claim 11, wherein the plurality of the artificial tree leaves are evergreen tree tips.

13. An artificial tree comprising:
a plurality of mechanically-coupled artificial tree branches, each artificial tree branch including a tree branch body formed by injection molding a first material over an internal structural member of a second material the internal structural member providing strengthening structural support for the tree branch, wherein the tree branch body includes:
a main body portion having an elongated shape with a first end and a second end;
a fastener proximate the first end, the fastener adapted to attach the artificial tree branch to a trunk of the tree; and
a plurality of sockets formed at various positions along the main body, each socket being formed as an outward bulge from the main body portion, the outward bulge defining a cavity to receive and retain artificial tree leaves.

14. A method for manufacturing an artificial tree branch, the method comprising: placing a plurality of pins at various positions in the interior of a mold having an interior surface corresponding to an exterior surface of the artificial tree branch;

softening a moldable first material;

arranging a structural member of a second material in an interior of the mold;

after arranging the structural member, injecting the softened first material into the mold to cover at least a portion of the structural member to form a main body portion having an elongated shape with a first end and a second end, a fastener proximate the first end, and a plurality of sockets at various positions along the main body corresponding to the various positions of the plurality of pins, each socket being formed as an outward bulge from the main body portion with a cavity reserved by a corresponding one of the plurality of pins;

after the injecting, reducing a temperature of the first material in the interior of the mold and removing the formed main body portion; and removing any remaining pins from the sockets.

15. The method of claim 14, wherein injecting the softened first material into the mold includes forming a protruding portion of the structural member that protrudes from the first end of the tree branch body to form the fastener.

16. The method of claim 15, wherein the protruding portion includes a hook.

17. The method of claim 14, wherein the fastener is a hook.

18. The method of claim 14, wherein the internal structural member comprises a wire.

19. The method of claim 14, wherein at least a portion of the interior of the mold includes a tree-bark texture to produce a tree-bark texture on at least a portion of an exterior of the main body portion.

20. The method of claim 14, wherein the elongated shape of the main body portion is generally straight.

* * * * *